(12) United States Patent
Ishibashi

(10) Patent No.: US 6,728,810 B1
(45) Date of Patent: Apr. 27, 2004

(54) DATA PROCESSING APPARATUS AND BUS CONTROL METHOD THEREFOR

(75) Inventor: Yasuhiro Ishibashi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/540,993

(22) Filed: Mar. 31, 2000

(30) Foreign Application Priority Data

May 27, 1999 (JP) .......................................... 11-148413

(51) Int. Cl.[7] .................. G06F 13/372; G06F 13/14; H04L 12/16; H04L 12/28
(52) U.S. Cl. .................. 710/124; 710/33; 370/260; 370/410; 370/431
(58) Field of Search .................. 710/105, 107, 710/308, 310, 124; 713/320; 725/93; 370/253, 400, 40; 348/14; 340/825; 706/14; 382/232

(56) References Cited

U.S. PATENT DOCUMENTS

| | | | | |
|---|---|---|---|---|
| 4,593,282 A | * | 6/1986 | Acampora et al. | 340/825.5 |
| 5,561,771 A | * | 10/1996 | Harriman et al. | 370/410 |
| 5,579,486 A | | 11/1996 | Oprescu et al. | |
| 5,649,122 A | * | 7/1997 | Wegner et al. | 710/105 |
| 5,742,847 A | * | 4/1998 | Knoll et al. | 706/14 |
| 5,754,807 A | * | 5/1998 | Lambrecht et al. | 710/308 |
| 5,825,752 A | * | 10/1998 | Fujimori et al. | 348/14.08 |
| 5,859,980 A | * | 1/1999 | Kalkunte | 370/253 |
| 6,032,211 A | * | 2/2000 | Hewitt | 710/107 |
| 6,079,024 A | * | 6/2000 | Hadjimohammadi et al. | 713/322 |
| 6,092,141 A | * | 7/2000 | Lange | 710/310 |
| 6,105,094 A | * | 8/2000 | Lindeman | 710/107 |
| 6,134,585 A | * | 10/2000 | Yamato | 725/93 |
| 6,188,699 B1 | * | 2/2001 | Lang et al. | 370/400 |
| 6,580,827 B2 | * | 6/2003 | Ueda | 382/232 |

* cited by examiner

Primary Examiner—Glenn A. Auve
Assistant Examiner—Christopher E. Lee
(74) Attorney, Agent, or Firm—Finnegan, Henderson, Farabow, Garrett & Dunner, L.L.P.

(57) ABSTRACT

A multimedia bus is an internal bus for which two transfer modes, a band-guaranteed cycle and an event-driven type asynchronous (async) cycle, are defined. In the band-guaranteed cycle, stream data is transferred between nodes in peer-to-peer mode by using a reserved band for each cycle time. There are three ways to control the band-guaranteed cycle using the reserved band cycle: (1) flow control for stopping data transmission in a reserved band cycle under the control of a receiver node, (2) control for executing a stream access in the async cycle and (3) control for accepting the async cycle even during the reserved band cycle. This can permit data transfer between nodes on the internal bus in peer-to-peer mode, thereby improving the performance of a system which deals with both an AV stream and computer data.

4 Claims, 10 Drawing Sheets

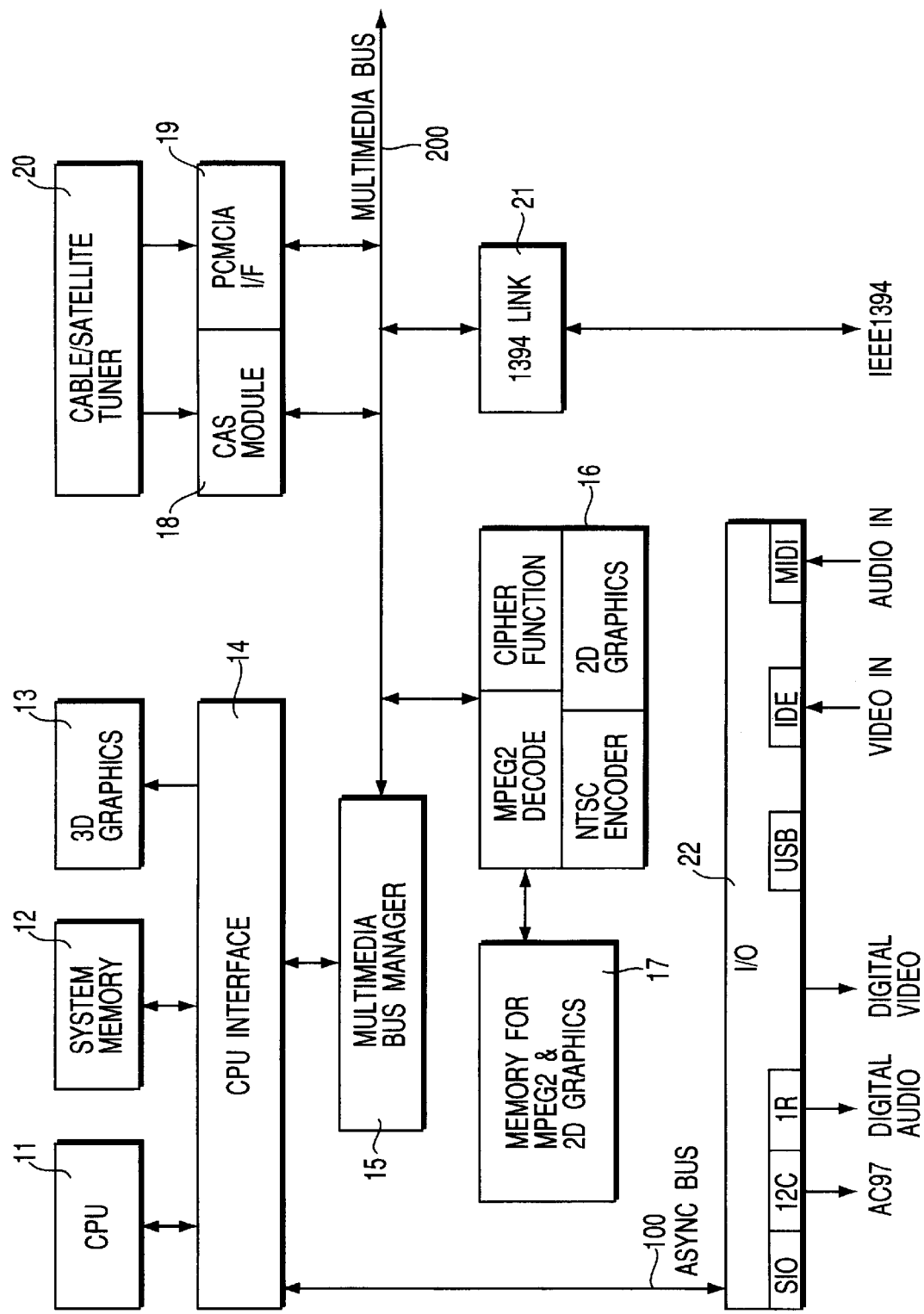
F I G. 1

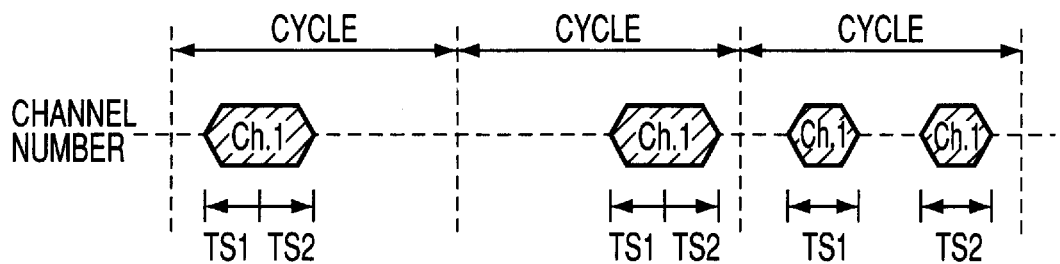
F I G. 2
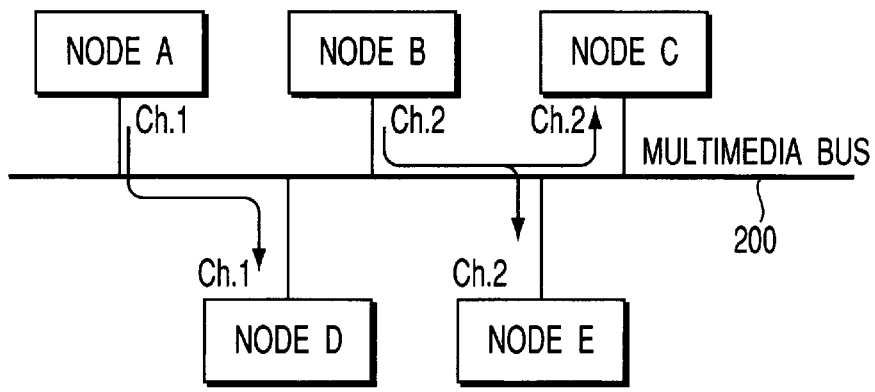
F I G. 3
| Config Add. | Ch Cnt (8BIT) | Ch No. (8BIT) | NECESSITY (16BIT) |
|---|---|---|---|
| 10 | | 2 | 123 |
| 14 | | 3 | 456 |
| 18 | | 4 | 789 |
| 7 | 6 | 5 | 4 | 3 | 2 | 1 | 0 |
|---|---|---|---|---|---|---|---|
| Ch.Ava | In/Out | Reject | | | | | |
F I G. 4

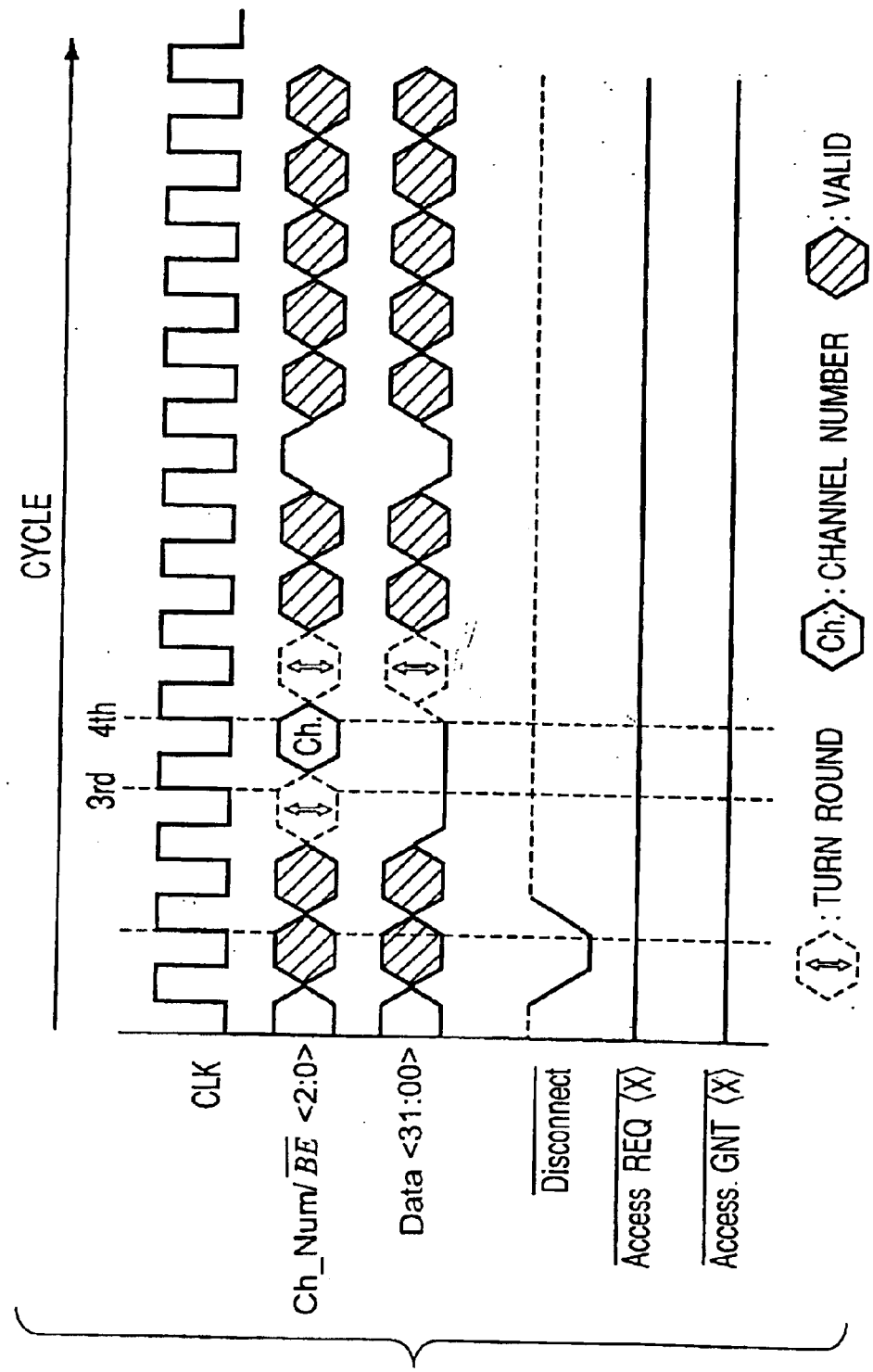
F I G. 6

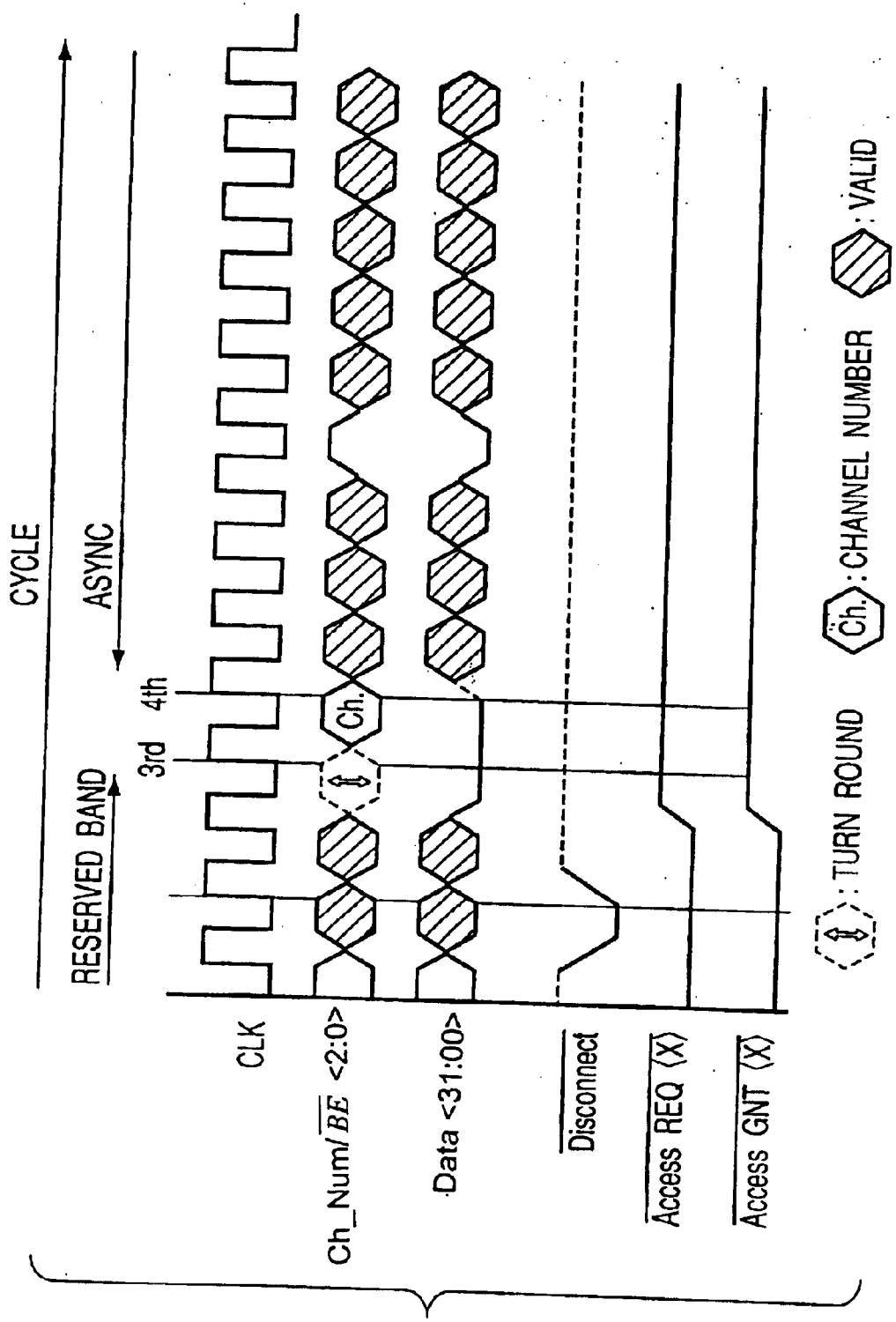
F I G. 11

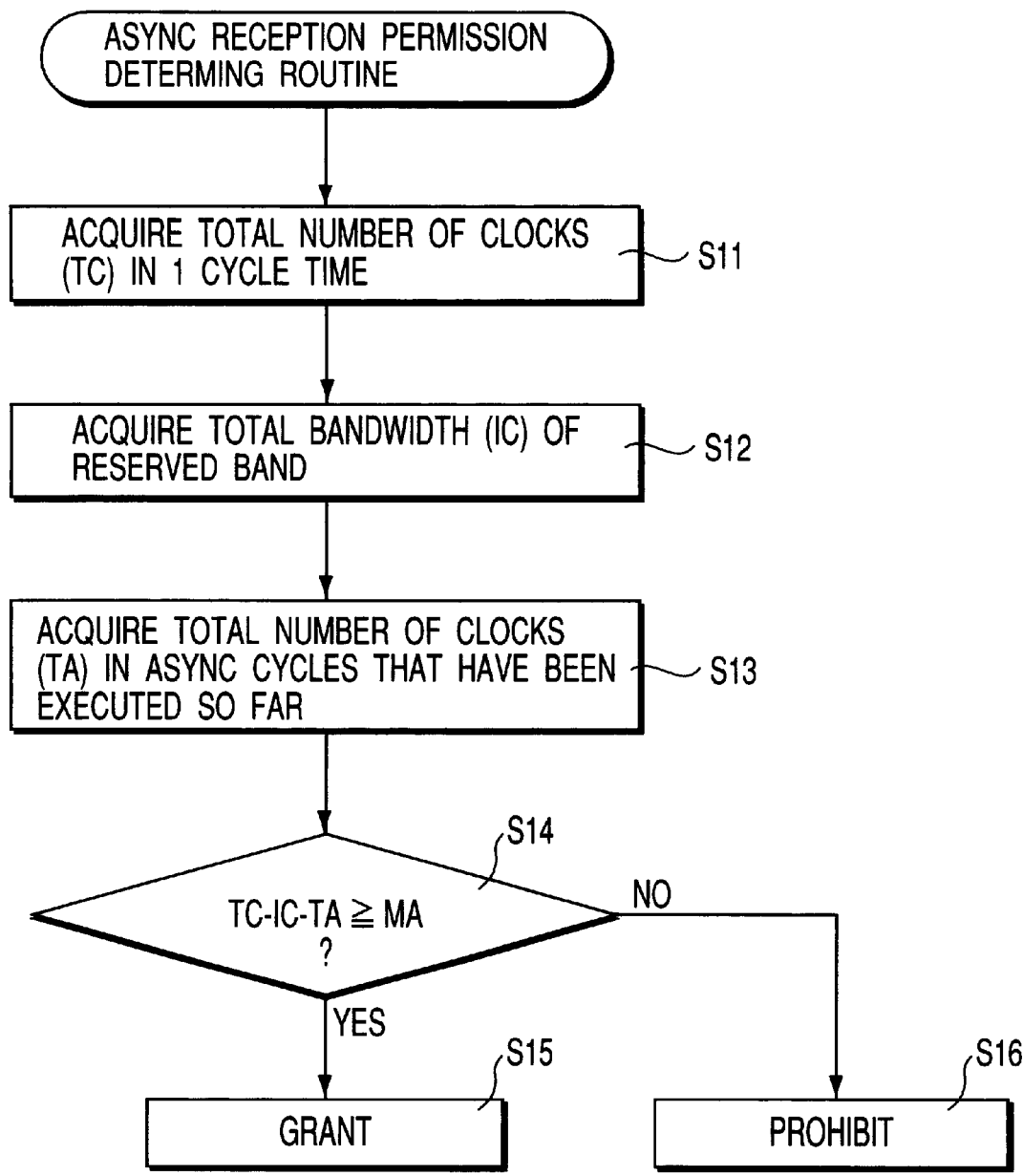
F I G. 17

DATA PROCESSING APPARATUS AND BUS CONTROL METHOD THEREFOR

CROSS-REFERENCE TO RELATED APPLICATIONS

This application is based upon and claims the benefit of priority from the prior Japanese Patent Application No. 11-148413, filed May 27, 1999, the entire contents of which are incorporated herein by reference.

BACKGROUND OF THE INVENTION

The present invention relates to a data processing apparatus and a bus control method therefor, and, more particularly, to a data processing apparatus which deals with various kinds of data, such as audio/video data, other data and programs, and a bus control method for the apparatus.

Recently, as the computer technology is advancing, various types of digital information devices, such as a multimedia-handling personal computer, set-top box, digital TV and game machine, have been developed. There has been a demand for a capability to handle various kinds of media, such as a broadcasting medium, communication medium and storage medium, in digital information devices of this type.

Accordingly, people are demanding that personal computers should be provided with an ability to deal with AV (Audio/Video) stream data that needs real-time processing in addition to functions for processing ordinary programs. For consumer AV machines, such as a set-top box, digital TV and game machine, there has been a demand for a function to cope with software-controlled interactive title playback or the like, computer data, i.e., other data than A/V stream data, and programs is requested.

Because the internal buses in conventional computers handle an AV stream and computer data as the same type, however, they are inadequate to feed AV streams that demand highly real-time processing. When traffic of computer data becomes suddenly heavy while AV data and computer data are flowing on the bus at the sa me time (e.g., at the time of printing or accessing a file), for example, the AV data brings about a significant transfer delay. This is because AV data and computer data are not distinguished from each other on the internal bus, so that it is not possible to perform a process of letting AV data which needs real-time processing flow first by priority.

Further, since the architectures of conventional computer machines have a difficulty in guaranteeing the latency of data transfer, they require that a huge buffer for guaranteeing the latency be provided in an AV device or the like which is to be connected to the internal bus. In a case of handling streams of a variable bit rate, such as DVD titles, it was necessary to install a large buffer so that the buffer on a reception-side device would not overflow even at the maximum transfer rate. This requirement is a big factor to increase the cost.

Furthermore, if priority is given only to the transfer of AV data, when an event which needs fast processing occurs, a process for that event may be delayed.

Conventional AV machines physically accomplish peer-to-peer connection of devices that handle AV streams by connecting a plurality of devices in the processing order of the AV streams. Therefore, AV streams are not basically input to a CPU. The recent appearance of media (piper media) which has AV streams and interactive commands integrated demands that a CPU should process streams. This makes the present physical peer-to-peer connection of devices difficult, and studies on bus connection have started.

BRIEF SUMMARY OF THE INVENTION

Accordingly, it is an object of the present invention to provide a data processing apparatus which can efficiently transfer stream data on an internal bus and is suitable for integration of AV streams and computer data, and a bus control method for the apparatus.

According to one aspect of the present invention, there is provided a data processing apparatus comprising an internal bus for which a band-guaranteed cycle in which stream data is transferable in a band-guaranteed state by assigning a predetermined reserved band for each cycle time is defined as a transfer mode; a plurality of nodes connected to the internal bus and capable of transmitting/receiving stream data by using the band-guaranteed cycle; and means for causing a receiver node, which is receiving stream data transferred in the band-guaranteed cycle, to output a predetermined signal on the internal bus, thereby causing a sender node, which is transmitting the stream data in the band-guaranteed cycle, to stop transmitting the stream data.

In the data processing apparatus, the sender node which has stopped transmitting the stream data may restart transmission of stream data in the band-guaranteed cycle in a next cycle time.

In the data processing apparatus, the internal bus may include a signal line for indicating an end of a bus cycle which is currently being executed, and the receiver node which is receiving stream data transferred in the band-guaranteed cycle may make the signal line active to thereby stop transmission of stream data from the sender node.

In the data processing apparatus, the receiver node may comprise a reception buffer for temporarily storing stream data received over the internal bus and means for detecting if an amount of data stored in the reception buffer has exceeded a predetermined value, whereby when the amount of data stored in the reception buffer has exceeded the predetermined value, the receiver node outputs the predetermined signal on the internal bus.

In the data processing apparatus, the band- guaranteed cycle may be directly executed in a peer-to-peer mode between a sender node and a receiver node to which a same channel number is assigned.

According to another aspect of the present invention, there is provided a data processing apparatus comprising an internal bus for which a band-guaranteed cycle in which stream data is transferable in a band-guaranteed state by assigning a predetermined reserved band for each cycle time is defined as a transfer mode; a plurality of nodes connected to the internal bus and capable of transmitting/receiving stream data by using the band-guaranteed cycle; means for assigning channel numbers respectively to the plurality of nodes connected to the internal bus such that data transfer in the band-guaranteed cycle is carried out in a peer-to-peer mode between nodes to which a same channel number is assigned; and means for causing a receiver node, which is receiving stream data transferred in the band-guaranteed cycle, to output a predetermined signal on the internal bus, thereby causing a sender node, which is transmitting the stream data in the band-guaranteed cycle, to stop transmitting the stream data.

According to a further aspect of the present invention, there is provided a data processing apparatus comprising an internal bus for which a band-guaranteed cycle in which stream data is transferable in a band-guaranteed state by assigning a predetermined reserved band for each cycle time and an asynchronous transfer cycle for executing a transfer cycle in a period other than the reserved band in accordance with a bus access request from a bus master are defined as transfer modes; a plurality of nodes connected to the internal bus and capable of transmitting/receiving data by using the band-guaranteed cycle or the asynchronous transfer cycle; means for assigning channel numbers respectively to the plurality of nodes connected to the internal bus such that data transfer in the band-guaranteed cycle is carried out in a peer-to-peer mode between nodes to which a same channel number is assigned; and means for causing a receiver node, which is receiving stream data transferred in the band-guaranteed cycle, to output a predetermined signal on the internal bus, thereby causing a sender node, which is transmitting the stream data in the band-guaranteed cycle, to stop transmitting the stream data.

According to a still further aspect of the present invention, there is provided a data processing apparatus comprising an internal bus for which a band-guaranteed cycle in which stream data is transferable in a band-guaranteed state by assigning a predetermined reserved band for each cycle time and an asynchronous transfer cycle for executing a transfer cycle in a period other than the reserved band in accordance with a bus access request from a bus master are defined as transfer modes; a plurality of nodes connected to the internal bus and capable of transmitting/receiving data by using the band-guaranteed cycle or the asynchronous transfer cycle; and means for giving a bus-using permission for the asynchronous transfer cycle to a sender node, which is transmitting stream data using the band-guaranteed cycle, in accordance with a bus access request from the sender node, wherein transmission of the stream data from the sender node to a receiver node can be executed in a period other than the reserved band.

In the data processing apparatus, the band-guaranteed cycle may be executed in a stream access mode for directly performing data transfer in a peer-to-peer mode between a sender node and a receiver node to which a same channel number is assigned, and when the sender node is granted a bus-using permission for the asynchronous transfer cycle, the sender node may transmit the stream data using the stream access mode in a period other than the reserved band by designating a sender node with a same channel number as the one used in the band-guaranteed cycle.

In the data processing apparatus, the sender node may comprise a transmission buffer for temporarily storing stream data to be transmitted in the band-guaranteed cycle and means for detecting if an amount of data stored in the transmission buffer has exceeded a predetermined value, whereby when the amount of data stored in the transmission buffer has exceeded the predetermined value, the sender node generates the bus access request.

According to a yet further aspect of the present invention, there is provided a data processing apparatus comprising an internal bus for which a band-guaranteed cycle in which stream data is transferable in a band-guaranteed state by assigning a predetermined reserved band for each cycle time and an asynchronous transfer cycle for executing a transfer cycle in a period other than the reserved band in accordance with a bus access request from a bus master are defined as transfer modes; a plurality of nodes connected to the internal bus and capable of transmitting/receiving data by using the band-guaranteed cycle or the asynchronous transfer cycle; and control means for inserting the asynchronous transfer cycle in the reserved band cycle in the band-guaranteed cycle when the bus access request is generated from a node on the internal bus while the band-guaranteed cycle is being executed on the internal bus, and executing a remaining portion of the band-guaranteed cycle after completion of the asynchronous transfer cycle.

In the data processing apparatus, the control means may include means for determining whether or not the asynchronous transfer cycle in the reserved band cycle in the band-guaranteed cycle that is being executed and an asynchronous transfer cycle to be newly inserted can both be finished in a current cycle time when the bus access request is generated from a node on the internal bus while the band-guaranteed cycle is being executed on the internal bus, and may permit or inhibit reception of the bus access request based on a result of that determination.

According to a yet further aspect of the present invention, there is provided a data processing apparatus comprising an internal bus for which a band-guaranteed cycle in which stream data is transferable in a band-guaranteed state by assigning a predetermined time to be used for data transfer for each cycle time is defined as a transfer mode; a plurality of nodes connected to the internal bus and capable of transmitting/receiving stream data by using the band-guaranteed cycle; and means for assigning channel numbers respectively to the plurality of nodes connected to the internal bus and outputting on the internal bus a channel number for which data transfer should be initiated, wherein data transfer in a peer-to-peer mode between a sender node and a receiver node to which the channel number output on the internal bus is assigned.

According to a still further aspect of the present invention, there is provided a bus control method adapted for use in an apparatus having an internal bus for which a band-guaranteed cycle in which stream data is transferable in a band-guaranteed state by assigning a predetermined reserved band for each cycle time is defined as a transfer mode, which method comprises the steps of causing a receiver node, which is receiving stream data transferred in the band-guaranteed cycle, to output a predetermined signal on the internal bus; and causing a sender node, which is transmitting the stream data in the band-guaranteed cycle, to stop transmitting the stream data.

According to a still further aspect of the present invention, there is provided a bus control method adapted for use in an apparatus having an internal bus for which a band-guaranteed cycle in which stream data is transferable in a band-guaranteed state by assigning a predetermined reserved band for each cycle time and an asynchronous transfer cycle for executing a transfer cycle in a period other than the reserved band in accordance with a bus access request from a bus master are defined as transfer modes, which method comprises the steps of giving a bus-using permission for the asynchronous transfer cycle to a sender node, which is transmitting stream data using the band-guaranteed cycle, in accordance with a bus access request from the sender node; and allowing the sender node to execute the asynchronous transfer cycle so that the sender node can execute transmission of the stream data from the sender node to a receiver node in a period other than the reserved band.

According to a still yet further aspect of the present invention, there is provided a bus control method adapted for use in a data processing apparatus having an internal bus for which a band-guaranteed cycle in which stream data is transferable in a band-guaranteed state by assigning a predetermined reserved band for each cycle time and an asynchronous transfer cycle for executing a transfer cycle in a period other than the reserved band in accordance with a bus access request from a bus master are defined as transfer modes, which method comprises the steps of inserting the asynchronous transfer cycle in the reserved band cycle in the band-guaranteed cycle when the bus access request is generated from a node on the internal bus while the band-guaranteed cycle is being executed on the internal bus; and executing a remaining portion of the band-guaranteed cycle after completion of the asynchronous transfer cycle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 1 is a block diagram illustrating the system structure of a data processing apparatus according to one embodiment of the present invention;

FIG. 2 is a diagram for explaining a cycle time which is used in multimedia bus control according to this embodiment;

FIG. 3 is a diagram for explaining a stream access which is used in the multimedia bus control according to this embodiment;

FIG. 4 is a diagram showing the contents of a channel control register used in the system of this embodiment;

FIG. 6 is a diagram showing specific timings for the flow control in FIGS. 5A and 5B;

FIG. 11 is a diagram showing specific timings for the async stream access control in FIGS. 10A and 10B;

FIG. 17 is a flowchart illustrating procedures of an async reception permission determining routine which is executed by a manager node in this embodiment.

DETAILED DESCRIPTION OF THE INVENTION

Figure 5A:
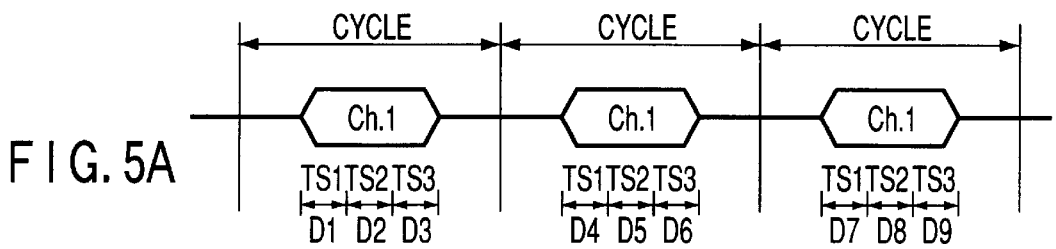
FIGS. 5A and 5B are diagrams for explaining the principle of reserved band cycle flow control which is used in this embodiment.

A preferred embodiment of the present invention will now be described with reference to the accompanying drawings.

FIG. 1 illustrates the system structure of a data processing apparatus according to one embodiment of the present invention. This data processing apparatus is a multimedia-handling computer which can handle various kinds of media, such as a broadcasting medium, communication medium and storage medium. To achieve both a program executing function and a function for dealing with AV (Audio/Video) stream data on a high order, this data processing apparatus has a multimedia bus 200 in addition to an ordinary internal bus (Async Bus) 100 which executes event-driven type asynchronous transfer. The multimedia bus 200 is an internal bus for which two transfer modes, namely a band-guaranteed cycle and event-driven type asynchronous transfer cycle, are defined. The use of this multimedia bus 200 can permit both computer data and AV stream data to be efficiently transferred. The band-guaranteed cycle whose details will be discussed later with reference to FIG. 2 basically means a transfer mode which transfers stream data in a band-guaranteed state by assigning a predetermined time to be used for data transfer for each cycle time as a reserved band.

System Structure

The specific system structure will be discussed below.

As illustrated, this system comprises a CPU 11, a system memory 12, a 3D graphics accelerator 13 and a CPU interface 14. The CPU 11, the system memory 12 and the 3D graphics accelerator 13 are mutually connected by the CPU interface 14, and execute a program executing routine, a 3D graphics computation routine and so forth. The CPU interface 14 is a host bus bridge which bidirectionally connects the CPU bus and the internal bus 100. Connected to the internal bus 100 is an I/O controller 22 which has various interfaces including an interface for outputting digital video signals to an external AV machine or the like and other interfaces for communication to various kinds of peripheral devices (SIO interface, I2C bus interface, IR (InfraRed) interface, USB interface, IDE interface and MIDI interface). Storage devices such as a DVD drive and HDD are connected to the I/O controller 22 via the IDE interface.

As illustrated, a multimedia bus manager 15, a media processor 16, a memory for MPEG2 & 2D graphics 17, a CAS module 18, a PCMCIA interface 19, an IEEE1394 interface 21, etc. are connected to the multimedia bus 200. The multimedia bus manager 15, media processor 16, memory for MPEG2 & 2D graphics 17, CAS module 18, PCMCIA interface 19, and IEEE1394 interface 21 are nodes each of which performs data transfer via the multimedia bus 200 and can use the aforementioned band-guaranteed cycle and asynchronous transfer cycle.

The multimedia bus manager 15 is the manager node for the multimedia bus 200, and performs control to execute the band-guaranteed cycle and asynchronous transfer cycle on the multimedia bus 200. Specifically, the multimedia bus manager 15 manages a reserved band, which is used in the band-guaranteed cycle, and a cycle time and performs bus control. The multimedia bus manager 15 also has a function to bidirectionally connect the multimedia bus 200 and the CPU interface 14, so that it can send an AV stream transferred from a node on the multimedia bus 200 to the CPU 11 and send an AV stream fetched into the system memory 12 from a DVD drive to a node on the multimedia bus 200.

The media processor 16 has capabilities such as MPEG-2 decoding, stream encoding, NTSC encoding and 2D graphics computation. It is this media processor 16 which executes control to reproduce and display an AV stream. The CAS module 18 is an exclusive interface for connection of a CATV/satellite tuner 20. The CATV/satellite tuner 20 may be connected via the PCMCIA interface 19.

The fundamental usage of the multimedia bus 200 will now be explained.

First, a description will be given of a case where video data received by the CATV/satellite tuner 20 is sent to a storage device and an external 1394 machine while being displayed on a monitor.

Video data consists of MPEG-2 transport streams which are sent to the media processor 16 from the CAS module 18 or the PCMCIA interface 19. In this case, the same channel number (e.g., channel number 1) is assigned to the CAS module 18 or the PCMCIA interface 19 which becomes a sender node and the media processor 16 which becomes a receiver node. Then, the sender node sends an MPEG-2 transport stream to the receiver node in peer-to-peer mode in the aforementioned band-guaranteed cycle. The media processor 16 performs, in parallel, a process of decoding the MPEG-2 transport stream and reproducing and displaying the decoded stream and an encoding routine to protect the MPEG-2 transport stream from an unauthorized copy. The encoded stream data is sent from the media processor 16 to the multimedia bus manager 15 and the IEEE1394 interface 21 in order. In this case, the same channel number (e.g., channel number 2) is assigned to the media processor 16 which is a sender node and the multimedia bus manager 15 and the IEEE1394 interface 21 which are receiver nodes. As a result, data transfer from the media processor 16 to the multimedia bus manager 15 and data transfer from the media processor 16 to the IEEE1394 interface 21 are carried out in peer-to-peer mode. This stream transfer with the channel number 2 is performed in parallel to the stream transfer with the channel number 1 in a time-divisional manner.

The encoded stream is temporarily loaded in the system memory 12 via the multimedia bus manager 15 and the CPU interface 14, and is then recorded on a storage device via the I/O controller 22. At the same time, the encoded stream is transferred to an external 1394 machine from the IEEE1394 interface 21.

Multimedia Bus

A specific transfer control scheme for the multimedia bus 200 will now be discussed.

1) Cycle time

As shown in FIG. 2, accesses to the multimedia bus 200 are carried out by dividing the time by given time units. This given interval is called "cycle time".

2) Transfer mode

To realize the aforementioned two transfer modes, the multimedia bus 200 has two bands. One is a reserved band and the other is an asynchronous band (hereinafter called "async band"). The reserved band is a band reserved in a cycle time for band-guaranteed transfer. A transfer cycle which uses this reserved band is the aforementioned band-guaranteed cycle (hereinafter called "reserved band cycle"), and a transfer cycle which uses the async band is the aforementioned asynchronous transfer cycle (hereinafter called "async cycle").

It is to be noted that the reserved band is not clearly distinguished from the async band by time, but a band which is processing a reserved band is the reserved band and a transfer cycle which is executed as needed in accordance with an access request in a period other than the reserved band is the async band.

3) Channels

All the accesses to the multimedia bus 200 are managed by channels, so that transfer over a plurality of channels can be performed in a time-divisional manner. FIG. 2 shows an example where a time of two time slots is reserved as the reserved bandwidth of the channel 1. The two time slots should not necessarily be consecutive along the time, but have only to be allocated within one cycle time.

4) Types of accesses

There are following three types of accesses.

a) Stream access

In the stream access, a sender node and a receiver node are designated for each channel and no other addresses than the channel are used. Wait control from the receiver side as in an ordinary PCI bus transaction is not carried out either. How this stream access is done is illustrated in FIG. 3. In FIG. 3, a node A is the sender node with the channel number 1 and a node D is the receiver node with the channel number 1. In this case, the nodes A and D to both of which the channel number 1 is assigned are logically connected on the multimedia bus 200 in a peer-to-peer fashion, and data transfer between the nodes A and D is directly carried out. For a single sender node, a plurality of receiver nodes with the same channel number as that of the sender node may be provided. FIG. 3 shows a case where a node B is the sender node with the channel number 2 and nodes C and E are the receiver nodes that have the channel number 2. In this case, stream data from the node B is multi-cast to the nodes C and E. According to this embodiment, the stream access is always used in the reserved band cycle. But, the stream access can also be used in the async cycle.

b) Single access

This access is used only in the async cycle and consists of an address and command transfer phase and a single data transfer phase following the former phase.

c) Burst access

This access is used only in the async cycle and consists of an address and command transfer phase and a plurality of data transfer phases following the former phase.

Channel Control Register

FIG. 4 shows the contents of a channel control register provided in each node on the multimedia bus 200.

The channel control register is defined in the configuration space and can have control information for a plurality of channels. The control information for each channel is constructed with channel control information (Ch Cnt), channel number information (Ch No.) and necessary band information (Necessity) as one set. The necessary band information indicates a band necessary for stream transfer, and is set for each stream to be transmitted and received by the driver (software) of the associated node. The channel number information indicates the channel number set by the manager node. The channel control information includes channel available information (Ch. Ava) indicating whether or not the associated channel is available, and I/O information indicating whether the associated channel is an input channel (receiver node) or an output channel (sender node).

As to which node takes an output/input action to which node, the manager node informs before access starts by using a configuration register.

Control in Reserved Band Cycle

According to this embodiment, the following three ways are prepared for transfer control in the reserved band cycle.

1) Flow control in reserved band cycle which stops stream access under the control of the receiver node.

2) Stream access control using the async cycle performs a stream access in the async cycle when requested by the sender node.

3) Async cycle insertion control accepts an async cycle even during the execution of the reserved band cycle and inserts the async cycle in the reserved band cycle.

The individual controls will specifically be discussed below.

Flow Control in Reserved Band Cycle

Figure 5B:
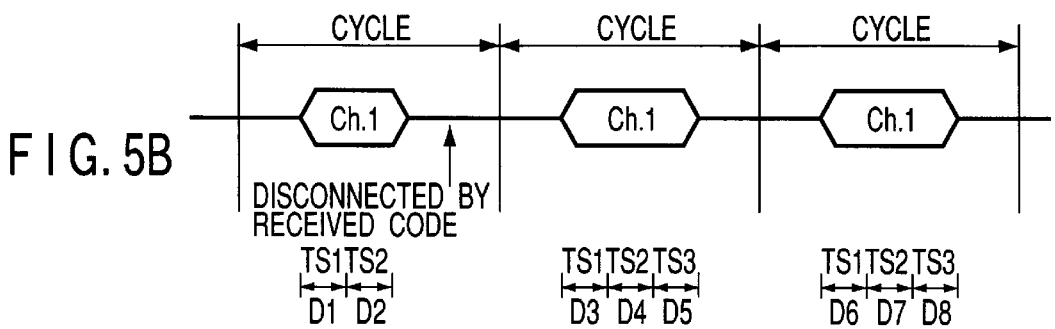

To begin with, the principle of the flow control in a reserved band cycle will be explained referring to FIGS. 5A and 5B. FIG. 5A presents a timing chart for a case where a stream access is carried out using a reserved band cycle of three time slots. When a disconnect signal (Disconnect) is output on the multimedia bus 200 from the receiver node during execution of the reserved band cycle, the sender node stops the current stream access and interrupts transmission of stream data in response to the disconnect signal. When the next cycle time comes, the sender node starts a stream access for transmitting subsequent stream data.

The provision of this scheme of stopping a stream access under the control of the receiver node can prevent overflowing of the buffer of the receiver node even when such overflowing is likely to occur due to a delay in the stream processing, reception of a variable rate stream or the like. It is therefore possible to efficiently execute the required real-time transfer only with the least required buffer.

FIG. 6 shows specific timings for the flow control.

First, signal lines include in the multimedia bus 200 will be explained. The multimedia bus 200 includes a clock signal (CLK) line, a 3-bit channel number/byte enable signal (ch_Num/$\overline{BE}$) line, a 32-bit data (Data) line, a disconnect signal ($\overline{Disconnect}$) line, a bus request signal ($\overline{AccessREQ}$) line, a bus grant signal ($\overline{AccessGNT}$) line and a ready signal ($\overline{Ready}$) line.

The channel number/byte enable signal (ch_Num/$\overline{BE}$) indicates the channel number whose access is to be started at the beginning of access, and indicates a valid byte lane of data on the data line. The channel number is output by the manager node in the reserved band cycle but is output by a bus master node which has obtained a bus-using permission in the async cycle.

The disconnect signal ($\overline{Disconnect}$) is a signal to disconnect a node from the current stream access and indicates the end of the transfer cycle. To stop transmission of stream data from the sender node during stream access, the receiver node outputs this disconnect signal. As the disconnect signal usually indicates the end of a stream access, the manager node outputs the disconnect signal.

The request signal ($\overline{AccessREQ}$) and the access grant signal ($\overline{AccessGNT}$) are used to manage the bus-using permission for the async cycle. A pair of the request signal and access grant signal are provided between the manager node that performs bus management and each node. An access request is made using the $\overline{AccessREQ}$ signal. The node which wants to access the bus asserts the $\overline{AccessREQ}$ signal. Adjustment of the access request is carried out by the manager node. This node is informed of access permission by the access grant signal, which is asserted at the same time as the assertion of the disconnect signal ($\overline{Disconnect}$). The node that is requesting an access latches the disconnect signal and the access grant signal by the CLK signal and when the disconnect signal is asserted, the node to which the access grant signal is asserted obtains the bus-using permission (master node).

In a stream access, each node can receive and output data in accordance with the clock (CLK) when its own channel number is designated by the channel number/byte enable signal (ch_Num/$\overline{BE}$). The channel number is output from the rising edge of the third clock from the clock at which the disconnect signal (indicating the end of the access cycle) has been asserted, and is latched at the rising edge of the fourth clock. In the reserved band cycle, because the manager node becomes the master, assertion of the access request signal that requests a stream access is inhibited. In the stream access mode, wait control by the $\overline{Ready}$ signal is not performed.

When the capacity of the reception buffer becomes smaller during a stream access in the reserved band cycle, the receiver node asserts the disconnect signal. Asserting the disconnect signal causes the sender node to stop stream transfer. As a result, the stream access which is in underway is terminated. Thereafter, as mentioned above, the channel number to be accessed next is output from the manager node at the rising edge of the third clock from the clock at which the disconnect signal (indicating the end of the access cycle) has been asserted.

Figure 7A:
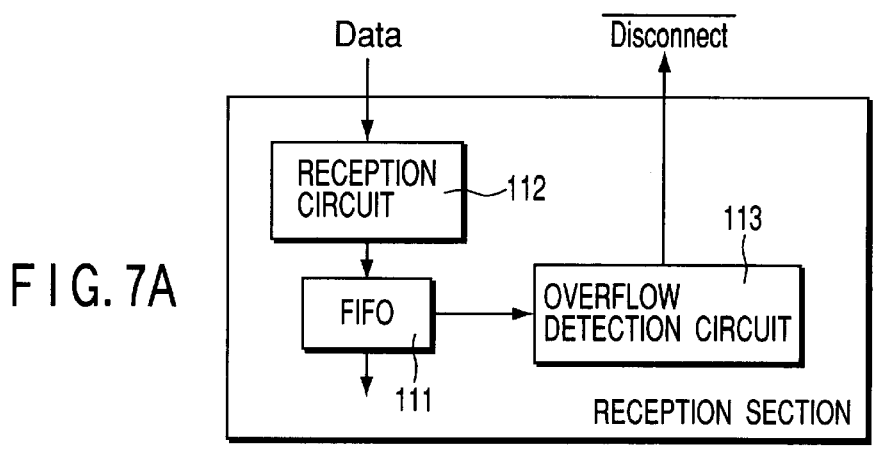
FIGS. 7A and 7B are diagrams exemplifying a hardware structure which accomplishes the flow control in FIGS. 5A and 5B.
Figure 7B:
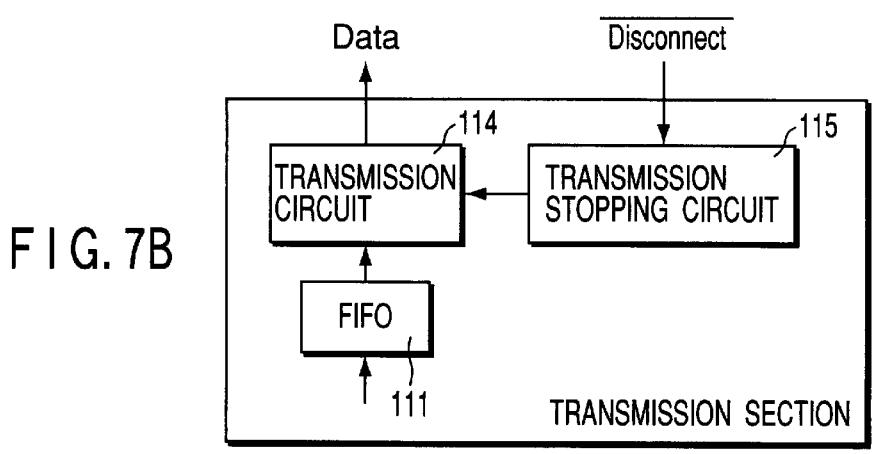

FIGS. 7A and 7B exemplify a hardware structure which accomplishes the flow control using the disconnect signal.

As shown in FIG. 7A, the reception section of each node is provided with a FIFO buffer 111, a reception circuit 112 and an overflow detection circuit 113. The FIFO buffer 111 is an input/output buffer for temporarily storing data that is exchanged via the multimedia bus 200. At the time of reception, stream data input via the multimedia bus 200 and the reception circuit 112 is sequentially written in the FIFO buffer 111. The stream data stored in the FIFO buffer 111 is read out and processed by an internal processing circuit. The overflow detection circuit 113 detects if the amount of data stored in the FIFO buffer 111 has exceeded a predetermined threshold value. When the amount of data stored in the FIFO buffer 111 has exceeded the predetermined threshold value, the disconnect signal is generated to prevent the FIFO buffer 111 from overflowing.

FIG. 7B shows the structure of a transmission section of each node. At the time of transmission, stream data externally input is input to the FIFO buffer 111. This stream data is read from the FIFO buffer 111 and sent on the multimedia bus 200 via a transmission circuit 114. During transmission of stream data, a transmission stopping circuit 115 monitors the disconnect signal . When the disconnect signal is asserted during transmission of stream data, the transmission stopping circuit 115 controls the transmission circuit 114 to stop the transmission of the stream data.

Figure 8:
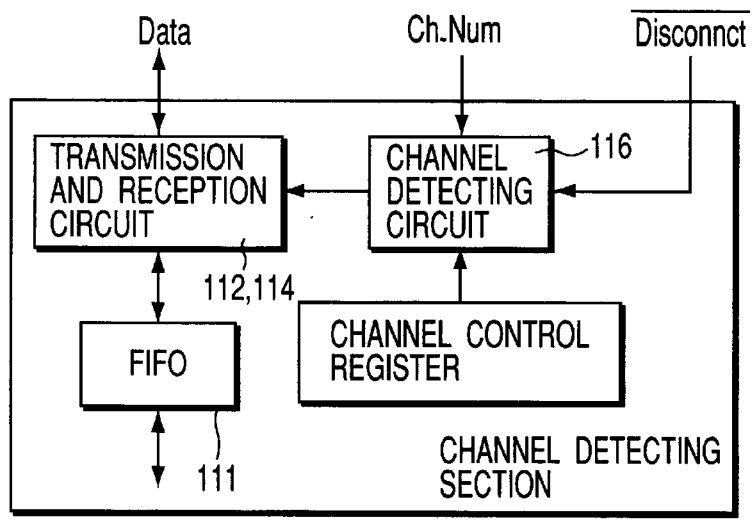
FIG. 8 is a diagram depicting the structure of a channel detecting section provided in each node in this embodiment.

FIG. 8 depicts the structure of a channel detecting section provided in each node in this embodiment.

A channel detecting circuit 116 latches the channel number output on the multimedia bus 200 at the third clock from the assertion of the disconnect signal, and compares it with the channel number set in its own channel control register. When the local channel number is designated, the channel detecting circuit 116 controls the transmission circuit and the reception circuit to start data input/output by the stream access.

Figure 9:
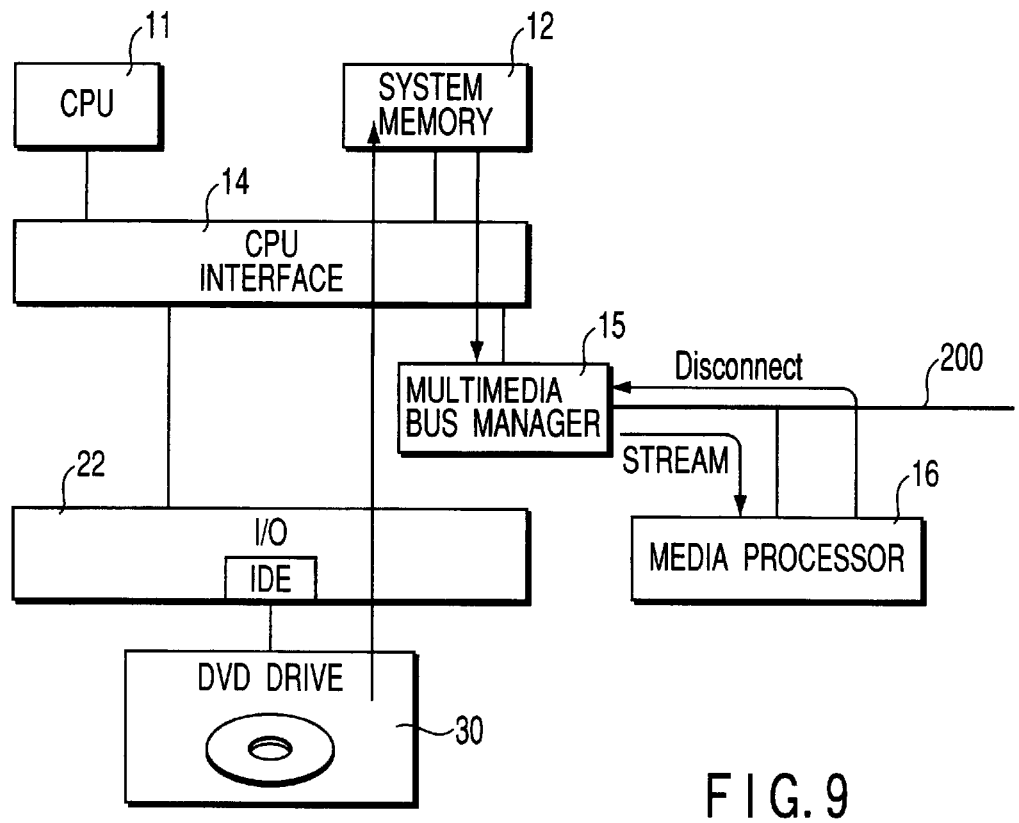
FIG. 9 is a diagram for explaining an application example of the flow control in FIGS. 5A and 5B.

Referring now to FIG. 9, a specific example of application of the flow control will be discussed.

It is assumed that a DVD title of a variable bit rate is read from a DVD-ROM drive 30 and is reproduced by the media processor 16. Because the DVD title of a variable bit rate is recorded on a DVD medium as a file, first, the file of the DVD title is read on the system memory 12 from the DVD-ROM drive 30 under the control of the CPU 11. Then, a stream access using the multimedia bus manager 15 as the sender node and the media processor 16 as the receiver node is executed in the reserved band cycle. When the amount of data stored in the reception buffer of the media processor 16 exceeds a predetermined value, the disconnect signal is output from the media processor 16. As a result, the current stream access by the multimedia bus manager 15 is stopped. This prevents the reception buffer from overflowing even at the time of data transfer at the maximum transfer rate, so that a stream can be transferred with the minimum capacity of the reception buffer.

Stream Access Control Using Async Cycle

Next, the principle of stream access control using the async cycle will be discussed with reference to FIGS. 10A and 10B.

Figure 10A:
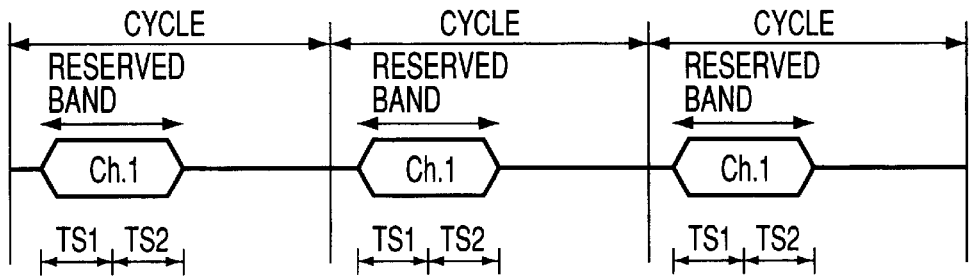
FIGS. 10A and 10B are diagrams for explaining the principle of async stream access control which is used in this embodiment.
Figure 10B:
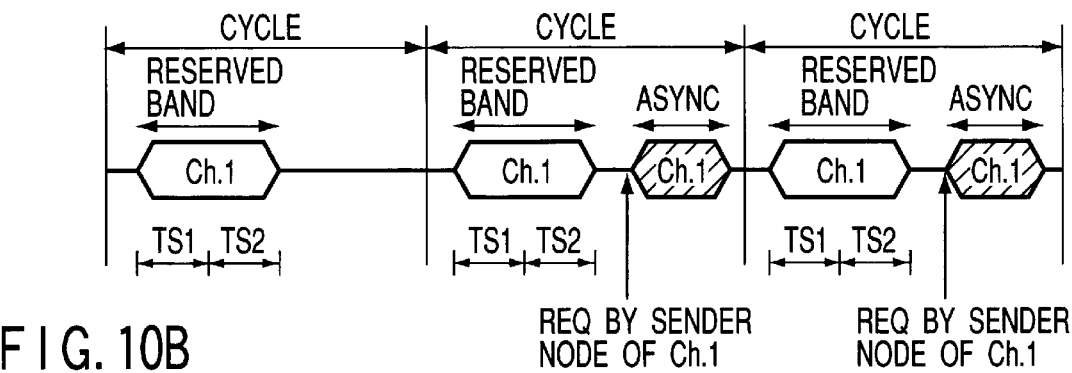

FIG. 10A presents a timing chart for a case where a stream access is carried out using a reserved band cycle of two time slots. The stream access control using the async cycle can allow a stream access to be executed in the async cycle. As shown in FIG. 10B, therefore, a stream access can be performed in a period other than the reserved band. The execution of the async cycle is granted when a bus request from the sender node is accepted.

FIG. 11 shows specific timings for a stream access using the async cycle.

When the amount of data stored in the transmission buffer of the sender node that is executing the reserved band cycle exceeds a predetermined value, the sender node generates the bus request Access REQ for the async cycle. When granted by the manager node, the sender node performs a stream access in the async cycle by designating the same channel number as that of the current reserved band cycle at the rising edge of the third clock from the clock at which the disconnect signal (indicating the end of the access cycle) has been asserted. Accordingly, a stream access can be executed in a period other than the reserved band.

Figure 12:
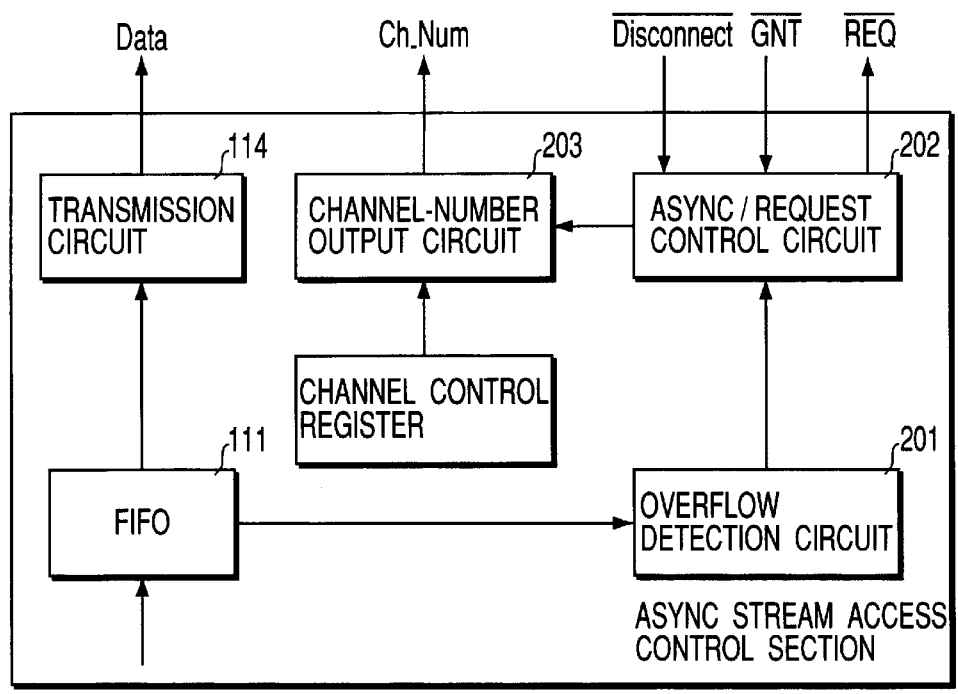
FIG. 12 is a diagram exemplifying a hardware structure which accomplishes the async stream access control in FIGS. 10A and 10B.

FIG. 12 exemplifies a hardware structure which accomplishes the stream access control using the async cycle.

At the time of transmission, externally input stream data is input to the FIFO buffer 111. This stream data is read out from the FIFO buffer 111 and sent on the multimedia bus 200 via the transmission circuit 114. When the amount of data stored in the FIFO buffer 111 has exceeded the predetermined value, an overflow detection circuit 201 controls an async/request control circuit 202 to generate the bus request (AccessREQ). When acquiring a bus-using permission through the grant signal (AccessGNT) from the manager node, the async/request control circuit 202 controls a channel-number output circuit 203 to output the same channel number as that of the current reserved band cycle at the rising edge of the third clock from the termination of the current access cycle that has been made by the disconnect signal. async/request control circuit 202 controls a channel-number output circuit 203 to output the same channel number as that of the current reserved band cycle at the rising edge of the third clock from the termination of the current access cycle that has been made by the disconnect signal.

Figure 13A:
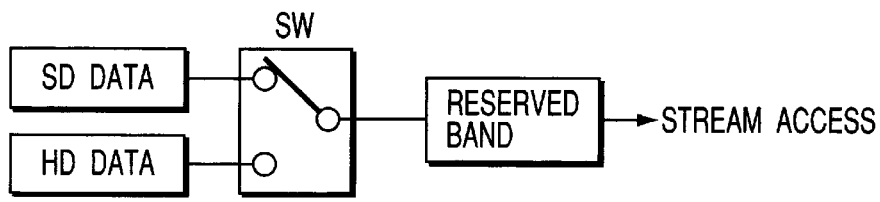
FIGS. 13A and 13B are diagrams for explaining an application example of the async stream access control in FIGS. 10A and 10B.
Figure 13B:
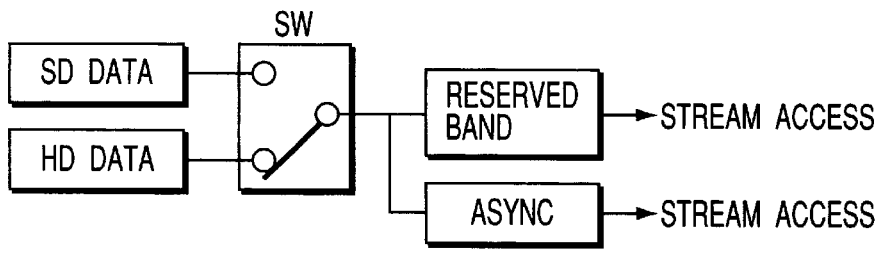

Referring now to FIGS. 13A and 13B, a specific example of application of the stream access using the async cycle will be discussed.

When the traffic of a stream to be processed by the sender node that is sending stream data in the reserved band cycle is changed, changing the necessary band (e.g., when a stream to be transmitted is changed from SD data of standard video images to HD data of high-definition video images by changing a program through the tuner), the assigned bands of the sender node and receiver node are changed. In this case, the driver of the associated node or the node itself rewrites the Necessity information, but it is practically difficult to dynamically change the reserved bandwidth at the transition of the cycle time.

When a stream to be transmitted is changed to HD data from SD data, therefore, the state changes from the one in FIG. 13A to the one in FIG. 13B and the stream access is carried out by using both the reserved band cycle and the async cycle until the reserved bandwidth is increased. After the reserved bandwidth is expanded, the state returns again to the one shown in FIG. 13A and a stream access is performed using the reserved band cycle alone. Even if the necessary band abruptly changes, therefore, it is possible to prevent overflowing of the buffer of the sender node or the like.

Async Cycle Insertion Control

Figure 14A:
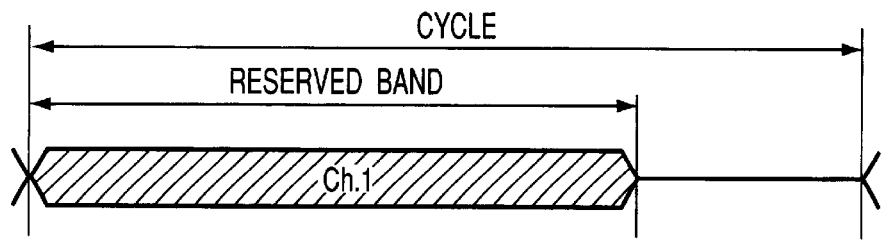
FIGS. 14A and 14B are diagrams for explaining the principle of async cycle insertion control which is used in this embodiment.
Figure 14B:
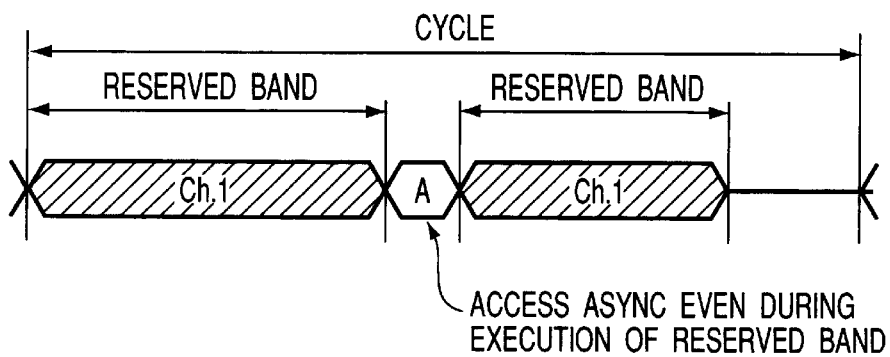

Referring to FIGS. 14A and 14B, the principle of async cycle insertion control will be explained.

An access request for the async cycle is accepted at any time (even during the execution of the reserved band cycle). When no access request for the async cycle is made during the execution of the reserved band cycle, the reserved band cycle is executed normally as shown in FIG. 14A. When an access request for the async cycle is accepted during the execution of the reserved band cycle, the stream access in the reserved band cycle is interrupted and the async cycle is executed as shown in FIG. 14B. The interrupted stream access is resumed after the async cycle is terminated. The band of the stream access that has been reserved as the reserved band should always be executed within the same time cycle.

Figure 15:
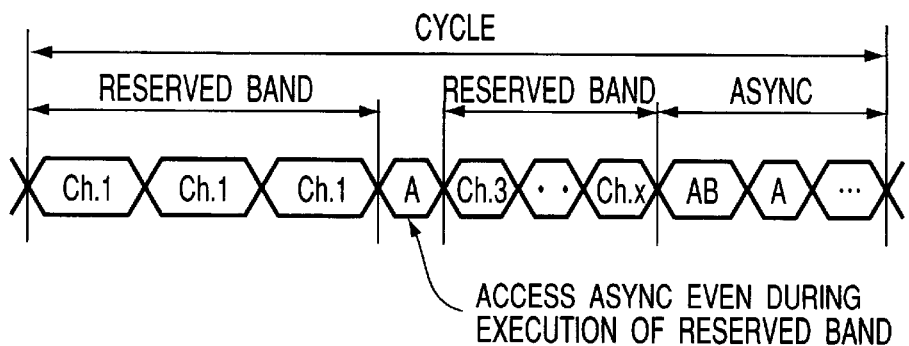
FIG. 15 is a diagram illustrating how the async cycle insertion control is executed according to this embodiment when stream accesses to a plurality of channels on a multimedia bus are performed in parallel in a time-divisional manner.

FIG. 15 illustrates how the async cycle insertion control is executed when stream accesses to a plurality of channels are performed in parallel in a time-divisional manner. In this example, the async cycle is inserted in the reserved band cycle with the channel number 3.

Figure 16:
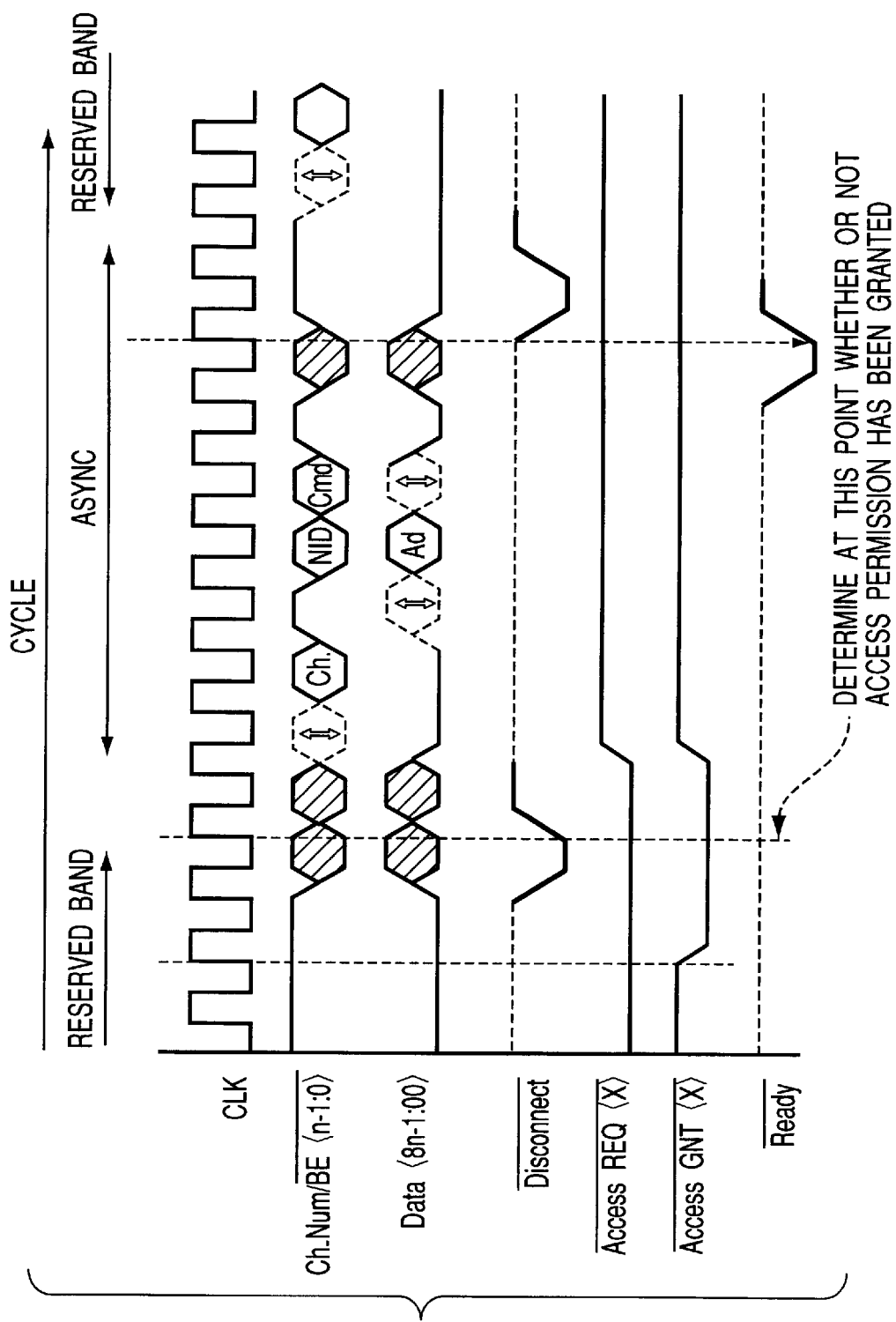
FIG. 16 is a diagram showing specific timings for the async cycle insertion control in FIGS. 14A and 14B.

FIG. 16 shows specific timings for the async cycle insertion control.

When an event that each node wants the CPU 11 to process or an event that node wants to inform to other nodes on the multimedia bus 200 occurs, this node generate the access request (AccessREQ). The management of the access request is performed by the manager node and access permission is informed by the grant signal (AccessGNT). To access the async cycle during execution of the reserved band cycle, the manager node sends the grant signal and then generates the disconnect signal. The node that has requested access determines whether or not the access request has been granted in accordance with the state of the grant signal upon generation of the disconnect signal. When access is granted, the node that has made the access request becomes the bus master and executes the async cycle. In the async cycle, the bus master outputs a channel number (0) indicating the broadcasting, then outputs the node ID, address, command and so forth for the target node, executing data read/write transfer. The channel number (0) is used only in a single access/burst access.

When the async cycle is completed, the bus master generates the disconnect signal. To resume the interrupted reserved band cycle, the manager node sends the channel number of the interrupted reserved band cycle onto the multimedia bus 200. This allows the interrupted reserved band cycle to be resumed. Of course, the manager node may generate the disconnect signal when detecting the end of the async cycle by means of the Ready signal.

Referring to a flowchart in FIG. 17, a description will now be given of the procedures of an async reception permission determining routine which is executed by the manager node.

As described earlier, the reserved band cycle shall always be executed for the multimedia bus 200. The actual width of every reserved band is managed by the number of clocks. The following will discuss an algorithm for determining whether or not to accept an async cycle.

First, the manager node acquires the total number of clocks (TC) in one cycle time (step S11). When the cycle time is 125 us and the clock has a frequency of 50 MHz, TC becomes equal too 6250. Next, the manager node acquires the total bandwidth of the reserved band (IC which is express by the number of clocks) in one cycle time (step S12). Then, the manager node obtains the total number of clocks (TA) for the async cycles that had been executed by the time the access request was received (step S13). Next, the manager node determines if the number of remaining clocks (TC-IC-TA) in the current cycle time is equal to or greater than the maximum number of clocks (MA) needed in the async cycle (single access) (step S14). When the former number (TC-IC-TA) is equal to or greater than the maximum number of clocks (MA), the manager node returns the grant signal ($\overline{\text{AccessGNT}}$) to grant the execution of the async cycle (step S15). When the number of remaining clocks (TC-IC-TA) is smaller than the maximum number of clocks (MA), on the other hand, the manager node does not return the grant signal and prohibits the execution of the async cycle (step S16). This control can improve the response characteristic with respect to a request for the async cycle while keeping the reserved band guaranteed.

According to the system of this embodiment, as described above, the use of the multimedia bus 200 for which two transfer modes, the band-guaranteed cycle and event-driven type asynchronous transfer cycle, are defined as the internal bus of a computer can realize a system suitable for integration of an AV stream and computer data. The system of this embodiment can be used as not only a computer but also as a platform of various kinds of digital information devices, such as a set-top box, digital TV and game machine.

According to the present invention, as apparent from the above, it is possible to realize a system suitable for integration of an AV stream and computer data by using a new bus control system that accomplishes efficient real-time data transfer on the internal bus. Particularly, more flexible data transfer can be executed in a band-guaranteed state by using (1) flow control which data transfer in the reserved band cycle under the control of the receiver node, (2) stream access control using the async cycle which performs a stream access in the async cycle and (3) async cycle insertion control accepts an async cycle even during the execution of the reserved band cycle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus comprising:

an internal bus for which a band-guaranteed cycle, in which stream data is transferable in a band-guaranteed state by assigning a predetermined reserved band for each cycle time, and an asynchronous transfer cycle for executing a transfer cycle in a period other than the reserved band in accordance with a bus access request from a bus master, are defined as transfer modes;

a plurality of devices connected to the internal bus and capable of transmitting/receiving data by using the band-guaranteed cycle or the asynchronous transfer cycle; and a controller configured to execute at least the band-guaranteed cycle for each cycle time, the controller being capable of inserting the asynchronous transfer cycle in the reserved band cycle in the band-guaranteed cycle while the band-guaranteed cycle is being executed on the internal bus, wherein the controller is capable of executing a stream access in the asynchronous transfer cycle by designating a same channel number as that of the reserved band cycle.

2. The data processing apparatus according to claim 1, wherein the controller executes the stream access in a period other than the reserved band.

3. A bus control method for use in an apparatus having an internal bus for which a band-guaranteed cycle, in which stream data is transferable in a band-guaranteed state by assigning a predetermined reserved band for each cycle time, and an asynchronous transfer cycle for executing a transfer cycle in a period other than the reserved band in accordance with a bus access request from a bus master, are defined as transfer modes, the method comprising:

allowing a plurality of devices to transmit/receive data via the internal bus by using the band-guaranteed cycle or the asynchronous transfer cycle; and executing at least the band-guaranteed cycle for each cycle time, the execution including inserting the asynchronous transfer cycle in the reserved band cycle in the band-guaranteed cycle while the band-guaranteed cycle is being executed on the internal bus, wherein the execution includes executing a stream access in the asynchronous transfer cycle by designating a same channel number as that of the reserved band cycle.

4. The method according to claim 3, wherein the execution includes executing the stream access in a period other than the reserved band.

* * * * *